(12) United States Patent  
Tarraf et al.

(10) Patent No.: US 9,226,178 B2
(45) Date of Patent: Dec. 29, 2015

(54) SELF-OPTIMIZING WIRELESS NETWORK

(71) Applicant: Reverb Networks, Inc., Sterling, VA (US)

(72) Inventors: Osama Tarraf, Newark, NJ (US); Trigui Hafedh, Ottawa (CA)

(73) Assignee: Reverb Networks, Sterling, VA (US)

( * ) Notice: Subject to any disclaimer, the term of this patent is extended or adjusted under 35 U.S.C. 154(b) by 0 days.

(21) Appl. No.: 14/195,515

(22) Filed: Mar. 3, 2014

(65) Prior Publication Data

US 2015/0011197 A1 Jan. 8, 2015

Related U.S. Application Data

(63) Continuation of application No. 13/273,354, filed on Oct. 14, 2011, now Pat. No. 8,665,835, which is a continuation of application No. 12/580,604, filed on Oct. 16, 2009, now abandoned.

(51) Int. Cl.
*H04W 24/02* (2009.01)
*H04W 16/18* (2009.01)

(52) U.S. Cl.
CPC ............ *H04W 24/02* (2013.01); *H04W 16/18* (2013.01)

(58) Field of Classification Search
CPC .............................. H04W 24/02; H04W 16/18
See application file for complete search history.

(56) References Cited

U.S. PATENT DOCUMENTS

| | | |
|---|---|---|
| 5,425,051 A | 6/1995 | Mahany |
| 5,796,722 A | 8/1998 | Kotzin et al. |
| 5,802,144 A | 9/1998 | Laird et al. |
| 5,859,839 A | 1/1999 | Ahlenius et al. |
| 6,051,408 A | 4/2000 | Bartsch et al. |
| 6,069,871 A | 5/2000 | Sharma et al. |
| 6,115,393 A | 9/2000 | Engel et al. |

(Continued)

FOREIGN PATENT DOCUMENTS

| | | |
|---|---|---|
| EP | 2129175 | 12/2010 |
| EP | 1952657 | 8/2011 |

(Continued)

OTHER PUBLICATIONS

International Search Report and Written Opinion mailed Jun. 18, 2010 for PCT Application No. PCT/US2010/31603.

(Continued)

*Primary Examiner* — Jae Y Lee

(57) ABSTRACT

Optimizing a plurality cell sites or sectors in a wireless network including receiving network data regarding a plurality of cell sites or sectors; determining a critical zone in which communication is degraded; determining best neighbor cell sites or sectors among the neighbor cell sites or sectors associated with the critical cell sites or sectors; determining if the critical cell sites or sectors in the critical zone have available resources for achieving a desired improvement in communications; determining if the best neighbor cell sites or sectors have available resources for achieving the desired improvement in communications; and altering wireless network parameters of the critical cell sites or sectors, or the best neighbor cells sites or sectors for achieving the desired improvement in communications. Altering wireless network parameters of the critical cell sites or sectors, or the best neighbor cell sites or sectors is performed continuously until the desired improvement in communications in the wireless network is achieved.

20 Claims, 5 Drawing Sheets

(56) References Cited

U.S. PATENT DOCUMENTS

| | | | |
|---|---|---|---|
| 6,138,016 | A | 10/2000 | Kulkarni et al. |
| 6,141,565 | A | 10/2000 | Feuerstein et al. |
| 6,253,077 | B1 | 6/2001 | Burt et al. |
| 6,304,556 | B1 | 10/2001 | Haas |
| 6,400,335 | B1 | 6/2002 | Weaver et al. |
| 6,400,355 | B1 | 6/2002 | Pin-Chien |
| 6,545,690 | B1 | 4/2003 | Hernandez |
| 6,549,529 | B1 | 4/2003 | Drabeck et al. |
| 6,574,477 | B1 | 6/2003 | Rathunde |
| 6,729,929 | B1 | 5/2004 | Sayers et al. |
| 6,829,491 | B1 | 12/2004 | Yea et al. |
| 6,842,431 | B2 | 1/2005 | Clarkson et al. |
| 6,937,863 | B1 | 8/2005 | Gordon et al. |
| 6,985,704 | B2 | 1/2006 | Yang et al. |
| 6,999,766 | B1 | 2/2006 | Padovani |
| 7,006,805 | B1 | 2/2006 | Sorrells et al. |
| 7,016,685 | B1 | 3/2006 | Cain et al. |
| 7,149,478 | B2 | 12/2006 | Hawe |
| 7,260,415 | B1 | 8/2007 | Oh |
| 7,323,945 | B2 | 1/2008 | Cyr et al. |
| 7,349,765 | B2 | 3/2008 | Reaume et al. |
| 7,353,160 | B2 | 4/2008 | Voigt |
| 7,385,503 | B1 | 6/2008 | Wells et al. |
| 7,461,037 | B2 | 12/2008 | Hätönen et al. |
| 7,477,920 | B2 | 1/2009 | Scheinert et al. |
| 7,505,010 | B2 | 3/2009 | Franzon et al. |
| 7,519,860 | B2 | 4/2009 | Hätönen et al. |
| 7,529,215 | B2 | 5/2009 | Osterling |
| 7,561,876 | B2 | 7/2009 | Chiou et al. |
| 7,577,103 | B2 | 8/2009 | Diaz et al. |
| 7,590,589 | B2 | 9/2009 | Hoffberg |
| 7,606,287 | B2 | 10/2009 | Mahany |
| 7,609,747 | B2 | 10/2009 | Mahany |
| 7,623,455 | B2 | 11/2009 | Hilla et al. |
| 7,653,407 | B2 | 1/2010 | Backes et al. |
| 7,663,555 | B2 | 2/2010 | Caimi et al. |
| 7,747,712 | B2 | 6/2010 | Petersen et al. |
| 7,757,103 | B2 | 7/2010 | Savransky et al. |
| 7,768,968 | B2 | 8/2010 | Plehn et al. |
| 7,827,268 | B2 | 11/2010 | Monier et al. |
| 7,839,882 | B2 | 11/2010 | Soliman |
| 7,877,095 | B2 | 1/2011 | Hubner et al. |
| 7,877,108 | B2 | 1/2011 | Wengerter et al. |
| 7,899,890 | B2 | 3/2011 | Petersen et al. |
| 7,904,080 | B2 | 3/2011 | Atkins et al. |
| 7,941,136 | B2 | 5/2011 | Reed et al. |
| 7,969,896 | B2 | 6/2011 | Sheinfeld et al. |
| 8,010,469 | B2 | 8/2011 | Kapoor et al. |
| 8,018,925 | B2 | 9/2011 | Noriega |
| 8,023,529 | B2 | 9/2011 | Oh et al. |
| 8,032,131 | B2 | 10/2011 | Dobson et al. |
| 8,050,191 | B2 | 11/2011 | Tirpak et al. |
| 8,117,294 | B2 | 2/2012 | Pollakowski et al. |
| 8,144,619 | B2 | 3/2012 | Hoffberg |
| 8,159,932 | B1 | 4/2012 | Hart et al. |
| 8,185,124 | B2 | 5/2012 | Antic et al. |
| 8,208,924 | B2 | 6/2012 | Han et al. |
| 8,295,877 | B2 | 10/2012 | Hui et al. |
| 8,320,850 | B1 | 11/2012 | Khlat |
| 8,355,728 | B2 | 1/2013 | Jung et al. |
| 8,385,900 | B2 | 2/2013 | Trigui |
| 8,509,762 | B2 | 8/2013 | Li et al. |
| 8,626,075 | B2 | 1/2014 | Turk et al. |
| 8,665,835 | B2 | 3/2014 | Hussein et al. |
| 2002/0056066 | A1 | 5/2002 | Gesbert et al. |
| 2003/0100344 | A1 | 5/2003 | Garmonev et al. |
| 2003/0191856 | A1 | 10/2003 | Lewis et al. |
| 2003/0228857 | A1* | 12/2003 | Maeki ............... 455/278.1 |
| 2003/0229478 | A1 | 12/2003 | Rappaport et al. |
| 2004/0018839 | A1 | 1/2004 | Andric et al. |
| 2004/0042473 | A1 | 3/2004 | Park et al. |
| 2004/0117226 | A1 | 6/2004 | Laiho et al. |
| 2004/0196834 | A1 | 10/2004 | Ofek et al. |
| 2004/0229621 | A1 | 11/2004 | Misra |
| 2004/0266442 | A1 | 12/2004 | Flanagan et al. |
| 2005/0009531 | A1 | 1/2005 | Lindquist et al. |
| 2005/0176440 | A1 | 8/2005 | Sang et al. |
| 2005/0243723 | A1 | 11/2005 | Randriamsay |
| 2005/0259571 | A1 | 11/2005 | Battou |
| 2005/0277444 | A1 | 12/2005 | Rensburg et al. |
| 2006/0083170 | A1 | 4/2006 | Silva et al. |
| 2006/0221886 | A1 | 10/2006 | Rao |
| 2006/0239224 | A1 | 10/2006 | Borst et al. |
| 2006/0246844 | A1 | 11/2006 | Kroboth et al. |
| 2007/0002765 | A1 | 1/2007 | Kadaba et al. |
| 2007/0021151 | A1 | 1/2007 | Mori et al. |
| 2007/0066298 | A1 | 3/2007 | Hurst |
| 2007/0087756 | A1 | 4/2007 | Hoffberg |
| 2007/0094729 | A1 | 4/2007 | Hoefelmeyer et al. |
| 2007/0147297 | A1 | 6/2007 | Diaz et al. |
| 2007/0195721 | A1 | 8/2007 | Backes et al. |
| 2007/0218862 | A1 | 9/2007 | Tatman et al. |
| 2007/0248039 | A1 | 10/2007 | Backes et al. |
| 2008/0004078 | A1 | 1/2008 | Barratt et al. |
| 2008/0016198 | A1 | 1/2008 | Johnston-Watt et al. |
| 2008/0020801 | A1 | 1/2008 | Fesas et al. |
| 2008/0039089 | A1 | 2/2008 | Berkman et al. |
| 2008/0130790 | A1 | 6/2008 | Forenza et al. |
| 2008/0207195 | A1 | 8/2008 | Ranta et al. |
| 2008/0225714 | A1 | 9/2008 | Denis |
| 2008/0268833 | A1 | 10/2008 | Huang et al. |
| 2008/0311924 | A1 | 12/2008 | Lucidarme |
| 2009/0003236 | A1 | 1/2009 | Aoyama et al. |
| 2009/0023477 | A1 | 1/2009 | Staudte |
| 2009/0036116 | A1 | 2/2009 | Kim et al. |
| 2009/0047968 | A1 | 2/2009 | Gunnarsson et al. |
| 2009/0075648 | A1* | 3/2009 | Reed et al. ............... 455/424 |
| 2009/0075655 | A1 | 3/2009 | Dobson et al. |
| 2009/0112932 | A1 | 4/2009 | Skierkowski et al. |
| 2009/0131038 | A1 | 5/2009 | MacNaughtan et al. |
| 2009/0163223 | A1 | 6/2009 | Casey |
| 2009/0221297 | A1 | 9/2009 | Wengerter et al. |
| 2009/0227261 | A1 | 9/2009 | Tiirola et al. |
| 2009/0257353 | A1 | 10/2009 | Song et al. |
| 2009/0264130 | A1 | 10/2009 | Catovic et al. |
| 2009/0312022 | A1 | 12/2009 | Viorel et al. |
| 2009/0315736 | A1 | 12/2009 | Reichl et al. |
| 2009/0323530 | A1 | 12/2009 | Trigui et al. |
| 2010/0002603 | A1 | 1/2010 | Gupta et al. |
| 2010/0008293 | A1 | 1/2010 | Gupta et al. |
| 2010/0029282 | A1 | 2/2010 | Stamoulis et al. |
| 2010/0046369 | A1 | 2/2010 | Zhao et al. |
| 2010/0075682 | A1 | 3/2010 | del Rio-Romero |
| 2010/0103911 | A1 | 4/2010 | Ji |
| 2010/0111013 | A1 | 5/2010 | Chou |
| 2010/0111047 | A1 | 5/2010 | Yang et al. |
| 2010/0112996 | A1* | 5/2010 | Ho et al. ............... 455/419 |
| 2010/0124934 | A1 | 5/2010 | Mach |
| 2010/0130194 | A1 | 5/2010 | Dickey |
| 2010/0149984 | A1 | 6/2010 | Kapoor et al. |
| 2010/0159936 | A1 | 6/2010 | Brisebois et al. |
| 2010/0190488 | A1 | 7/2010 | Jung et al. |
| 2010/0203881 | A1* | 8/2010 | del Rio Romero et al. ... 455/423 |
| 2010/0214939 | A1 | 8/2010 | Ryan |
| 2010/0216453 | A1 | 8/2010 | Kallin et al. |
| 2010/0216467 | A1 | 8/2010 | Ryan et al. |
| 2010/0216477 | A1 | 8/2010 | Ryan |
| 2010/0232318 | A1 | 9/2010 | Sarkar |
| 2010/0235285 | A1 | 9/2010 | Hoffberg |
| 2010/0254344 | A1 | 10/2010 | Wei et al. |
| 2010/0278161 | A1 | 11/2010 | Ore et al. |
| 2010/0284303 | A1 | 11/2010 | Catovic et al. |
| 2010/0299419 | A1 | 11/2010 | Ramankutty et al. |
| 2010/0303174 | A1 | 12/2010 | Oh et al. |
| 2010/0309799 | A1 | 12/2010 | Nunzi et al. |
| 2010/0311415 | A1 | 12/2010 | Hamabe et al. |
| 2010/0311421 | A1 | 12/2010 | Mach |
| 2010/0325267 | A1 | 12/2010 | Mishra et al. |
| 2010/0327766 | A1 | 12/2010 | Recker et al. |
| 2011/0009105 | A1* | 1/2011 | Lee et al. ............... 455/418 |
| 2011/0014925 | A1 | 1/2011 | Antic et al. |
| 2011/0028144 | A1 | 2/2011 | Catovic et al. |
| 2011/0034179 | A1 | 2/2011 | David et al. |
| 2011/0044165 | A1 | 2/2011 | Ni et al. |

(56) References Cited

U.S. PATENT DOCUMENTS

| | | | |
|---|---|---|---|
| 2011/0045865 A1 | 2/2011 | Viering et al. |
| 2011/0059744 A1 | 3/2011 | Won et al. |
| 2011/0090820 A1 | 4/2011 | Hussein et al. |
| 2011/0092195 A1 | 4/2011 | Hussein et al. |
| 2011/0096687 A1 | 4/2011 | Dottling et al. |
| 2011/0096688 A1 | 4/2011 | Sachs et al. |
| 2011/0105139 A1 | 5/2011 | On |
| 2011/0111700 A1 | 5/2011 | Hackett |
| 2011/0130135 A1 | 6/2011 | Trigui |
| 2011/0136478 A1 | 6/2011 | Trigui |
| 2011/0141972 A1 | 6/2011 | Oh et al. |
| 2011/0151881 A1 | 6/2011 | Chou et al. |
| 2011/0190016 A1 | 8/2011 | Hamabe et al. |
| 2011/0199985 A1 | 8/2011 | Cai et al. |
| 2011/0230222 A1 | 9/2011 | Reudink |
| 2011/0252477 A1 | 10/2011 | Sridhar et al. |
| 2011/0280157 A1 | 11/2011 | Suerbaum |
| 2011/0294527 A1 | 12/2011 | Brueck et al. |
| 2012/0009912 A1 | 1/2012 | Wang et al. |
| 2012/0026918 A1 | 2/2012 | Won et al. |
| 2012/0026941 A1 | 2/2012 | Ahmad et al. |
| 2012/0028584 A1 | 2/2012 | Zhang et al. |
| 2012/0028664 A1 | 2/2012 | Zhang et al. |
| 2012/0034919 A1 | 2/2012 | Nakata et al. |
| 2012/0066377 A1 | 3/2012 | Li et al. |
| 2012/0087257 A1 | 4/2012 | Larsson et al. |
| 2012/0147765 A1 | 6/2012 | Wigren |
| 2012/0147828 A1 | 6/2012 | Wigren |
| 2012/0170478 A1 | 7/2012 | Doettling et al. |
| 2012/0182874 A1 | 7/2012 | Siomina et al. |
| 2012/0252479 A1 | 10/2012 | Morita et al. |
| 2012/0264470 A1 | 10/2012 | Bajj et al. |
| 2012/0270536 A1 | 10/2012 | Ratasuk et al. |
| 2012/0295609 A1 | 11/2012 | Li et al. |
| 2012/0327797 A1 | 12/2012 | Siomina et al. |
| 2013/0028107 A1 | 1/2013 | Ho et al. |
| 2013/0114464 A1 | 5/2013 | Tarraf et al. |
| 2013/0196650 A1 | 8/2013 | Futaki |
| 2013/0217435 A1 | 8/2013 | Tarraf et al. |
| 2013/0229914 A1 | 9/2013 | Suerbaum |
| 2013/0242736 A1 | 9/2013 | Tarraf et al. |
| 2013/0322395 A1 | 12/2013 | Kazmi et al. |
| 2015/0011197 A1 | 1/2015 | Tarraf et al. |

FOREIGN PATENT DOCUMENTS

| | | |
|---|---|---|
| WO | WO 2007/063426 A2 | 6/2007 |
| WO | WO 2010132884 | 11/2010 |
| WO | WO 2011005524 | 1/2011 |
| WO | WO2012/072445 | 6/2012 |

OTHER PUBLICATIONS

U.S. Office Action mailed Oct. 13, 2010 for U.S. Appl. No. 12/385,752, filed Apr. 17, 2009.

U.S. Office Action mailed May 5, 2011 for U.S. Appl. No. 12/385,752, filed Apr. 17, 2009.

International Search Report and Written Opinion mailed Nov. 24, 2010 for PCT Application No. PCT/US2010/050627.

International Search Report and Written Opinion mailed Nov. 15, 2010 for PCT Application No. PCT/US2010/048929.

U.S. Office Action mailed Dec. 22, 2011 for U.S. Appl. No. 12/718,189, filed Mar. 5, 2010.

U.S. Office Action mailed Dec. 29, 2011 for U.S. Appl. No. 12/634,057, filed Dec. 9, 2009.

International Search Report and Written Opinion mailed Nov. 3, 2010 for PCT Application No. PCT/US2010/048927.

Amirijoo et al., "Cell Outage Management in LTE Networks," COST 2100 TD(9)941, Vienna, Austria, Sep. 28-30, 2009.

Mueller et al., "A Cell Outage Detection Algorithm Using Neighbor Cell List Reports" 2008.

U.S. Office Action mailed Feb. 27, 2012 for U.S. Appl. No. 12/385,752, filed Apr. 17, 2009.

U.S. Office Action mailed Jun. 6, 2012 for U.S. Appl. No. 12/634,057, filed Dec. 9, 2009.

U.S. Final Office Action mailed Jul. 13, 2012 for U.S. Appl. No. 12/385,752, filed Apr. 17, 2009.

U.S. Final Office Action mailed Aug. 29, 2012 for U.S. Appl. No. 12/718,189, filed Mar. 5, 2010.

International Search Report and Written Opinion mailed Nov. 5, 2012 for PCT Application No. PCT/US2012/054204.

"Self-Optimizing Networks: The Benefits of SON in LTE," 4G americas, Jul. 2011.

International Search Report and Written Opinion mailed Feb. 5, 2013 for PCT Application No. PCT/US2012/064131.

U.S. Office Action mailed Mar. 18, 2013 for U.S. Appl. No. 12/580,604, filed Oct. 16, 2009.

U.S. Office Action mailed Dec. 3, 2012 for U.S. Appl. No. 12/580,604, filed Oct. 16, 2009.

Lehtimaki et al., "A SOM Based Approach for Visualization of GSM Network Performance Data," Helsinki University of Technology, 2005.

Blume et al., "Energy Savings in Mobile Networks Based on Adaptation to Traffic Statistics," Bell Labs Technical Journal 15(2), 77-94 (2010) © 2010 Alcatel-Lucent.

International Search Report and Written Opinion mailed Apr. 29, 2013 for PCT Application No. PCT/US2013/026102.

Non-Final Office Action mailed Apr. 16, 2013 for U.S. Appl. No. 13/273,354, filed Oct. 14, 2011.

Final Office Action mailed Jul. 31, 2014 for U.S. Appl. No. 12/718,189.

Non-Final Office Action mailed Jan. 16, 2014 for U.S. Appl. No. 12/718,189.

Non-Final Office Action mailed Oct. 9, 2014 for U.S. Appl. No. 13/606,528.

Non-Final Office Action mailed Jan. 5, 2015 for U.S. Appl. No. 13/670,830.

Office Action for U.S. Appl. No. 12/718,189, mailed Jul. 6, 2015.

International Search Report and Written Opinion for International Application No. PCT/US2012/038243, mailed Aug. 17, 2012.

European Search Report for European Appln. No. 12829986; issued Jun. 2, 2015.

Feng et al., "Self-Organizing Networks (SON) in 3Gpp Long Term Evolution" Nomore Research GmbH (2008).

* cited by examiner

SELF-OPTIMIZING WIRELESS NETWORK

CROSS-REFERENCE TO RELATED APPLICATION

This application is a continuation application of U.S. patent application Ser. No. 13/273,354, filed Oct. 14, 2011, and entitled "Self-Optimizing Wireless Networks," now U.S. Pat. No. 8,665,835, which is a continuation application of U.S. patent application Ser. No. 12/580,604, filed Oct. 16, 2009, and entitled "Self-Optimizing Wireless Networks," each of which is incorporated herein by reference in its entirety.

BACKGROUND OF THE INVENTION

1. Field of the Invention

The present invention generally relates to planning and optimization for a wireless network. In particular, the present invention relates to a system that monitors network performance, and makes changes to network parameters to enhance performance.

2. Description of the Related Art

Network planning of a wireless network relies on static approaches for site locations and dimensioning of the radio resources to meet specified traffic demand at busy hours. In a wireless network, a large number of base stations (i.e., cell sites) can be served by one or more antennas. The base station hardware will send a radio frequency signal to the antennas, which will typically be placed on towers or buildings. Each antenna (i.e., sector) serves end-users located in a coverage area. Within a coverage area different types of services can be provided (e.g., voice and data services).

The coverage area provided by an antenna is determined by antenna configurations and input power to the antenna. Antenna configurations are, for example, the antenna horizontal pointing direction, the azimuth beamwidth of the antenna, and downtilt angle of the antenna. Modifying these antenna configurations will change the area the antenna is serving (i.e., coverage area) and possibly areas served by other surrounding antennas.

Input power (i.e., the power sent from the base station or cell site) to the antenna will also affect the coverage of the antenna as well as the interference that impacts the coverage areas of neighboring antennas. For example, if an antenna's input power is increased, the coverage area of the antenna may increase as well, thereby causing interference to the coverage area of a neighboring antenna and affecting the quality of service in that neighboring antenna's coverage area. When the radio signal quality is better, due to good network planning and performance, higher data rates for voice and data services can be achieved without consuming too many radio power resources.

Network planning and optimization is a process of finding the best configuration of the wireless network so as to maximize performance of the network. This process typically starts with an already working wireless network, and then calculations and analysis are done by engineers using software and hardware tools and extensive simulations for the network. Once a better configuration is determined, the new configuration will be manually implemented in the network.

However, network planning and optimization consumes a high amount of human resources. In addition, it is a lengthy process which is done only when needed or periodically with long periods between implementation. In addition, because this process is manual and lengthy, it is conducted with low frequency, which results in leaving the network or parts of the network without optimization for long periods of time. Thus, network resource usage is not maximized and unused available network resources result in significant revenue loss. Finally, quality of service is degraded, which affects the end user's overall customer satisfaction.

Therefore, it would be useful to implement an automated system for network planning and optimization that adjusts radio resources and network parameters to maximize overall network performance.

SUMMARY OF THE INVENTION

An embodiment of the invention is directed to a method for optimizing a plurality cell sites/sectors in a wireless network. The method includes receiving network data regarding a plurality of cell sites/sectors, each cell site/sector corresponding to a coverage area for providing communications in a wireless network; evaluating the network data to determine if communications provided by the plurality of cell sites/sectors has been degraded; and determining a critical zone in which communication is degraded. The critical zone includes critical cell sites/sectors needing improved communications and neighbor cell sites/sectors corresponding to the critical cell sites/sectors.

The method also includes determining best neighbor cell sites/sectors among the neighbor cell sites/sectors; determining if the critical cell sites/sectors in the critical zone have available resources for achieving a desired improvement in communications; determining if the best neighbor cell sites/sectors have available resources for achieving the desired improvement in communications, when it is determined that the critical cells sites do not have adequate available resources for achieving the desired improvements in communications; altering wireless network parameters of the critical cell sites/sectors or the best neighbor cells sites for achieving the desired improvement in communications; and determining if the desired improvement in communications has been achieved by altering the wireless network parameters.

Altering wireless network parameters of the critical cell sites/sectors or the best neighbor cell sites/sectors are performed continuously until the desired improvement in communications in the wireless network is achieved.

An embodiment of the invention is also directed to program recorded on a computer-readable storage medium for optimizing a plurality cell sites/sectors in a wireless network. The program causes a computer to execute optimizing steps comprising receiving network data regarding a plurality of cell sites/sectors; evaluating the network data to determine if communications provided by the plurality of cell sites/sectors has been degraded; and determining a critical zone in which communication is degraded.

The program also causes the computer to perform the steps of determining best neighbor cell sites/sectors among the neighbor cell sites/sectors; determining if the critical cell sites/sectors have available resources for achieving a desired improvement in communications; determining if the best neighbor cell sites/sectors have available resources for achieving the desired improvement in communications, when it is determined that the critical cells sites do not have adequate available resources; altering wireless network parameters of the critical cell sites/sectors or the best neighbor cells sites for achieving the desired improvement in communications; and determining if the desired improvement in communications has been achieved by altering the wireless network parameters.

An embodiment of the invention is also directed to a system for optimizing a plurality cell sites/sectors in a wireless network. The system comprising an optimization apparatus that monitors network data associated with a plurality of cell sites/sectors and performs alterations to network parameters wireless network; at least one controller configured to perform data communications with the optimization apparatus; a least one base station configured to perform data communication with the at least one controller; at least one controllable antenna configured to perform data communication with the at least one base station and a plurality of subscribers distributed in a plurality of coverage areas; and a dynamic load balancing apparatus configured to perform data communication with the optimization apparatus and the at least one controllable antenna.

An embodiment of the invention is also directed an apparatus for optimizing a plurality cell sites/sectors in a wireless network comprises a communication interface; at least one processor; and a memory, the memory storing a optimizing program for causing the apparatus to perform optimizing operations.

BRIEF DESCRIPTION OF THE DRAWINGS

In the drawings, like reference numbers generally indicate identical, functionally similar and/or structurally similar elements. Embodiments of the invention will be described with reference to the accompanying drawings, wherein.

Figure 1:
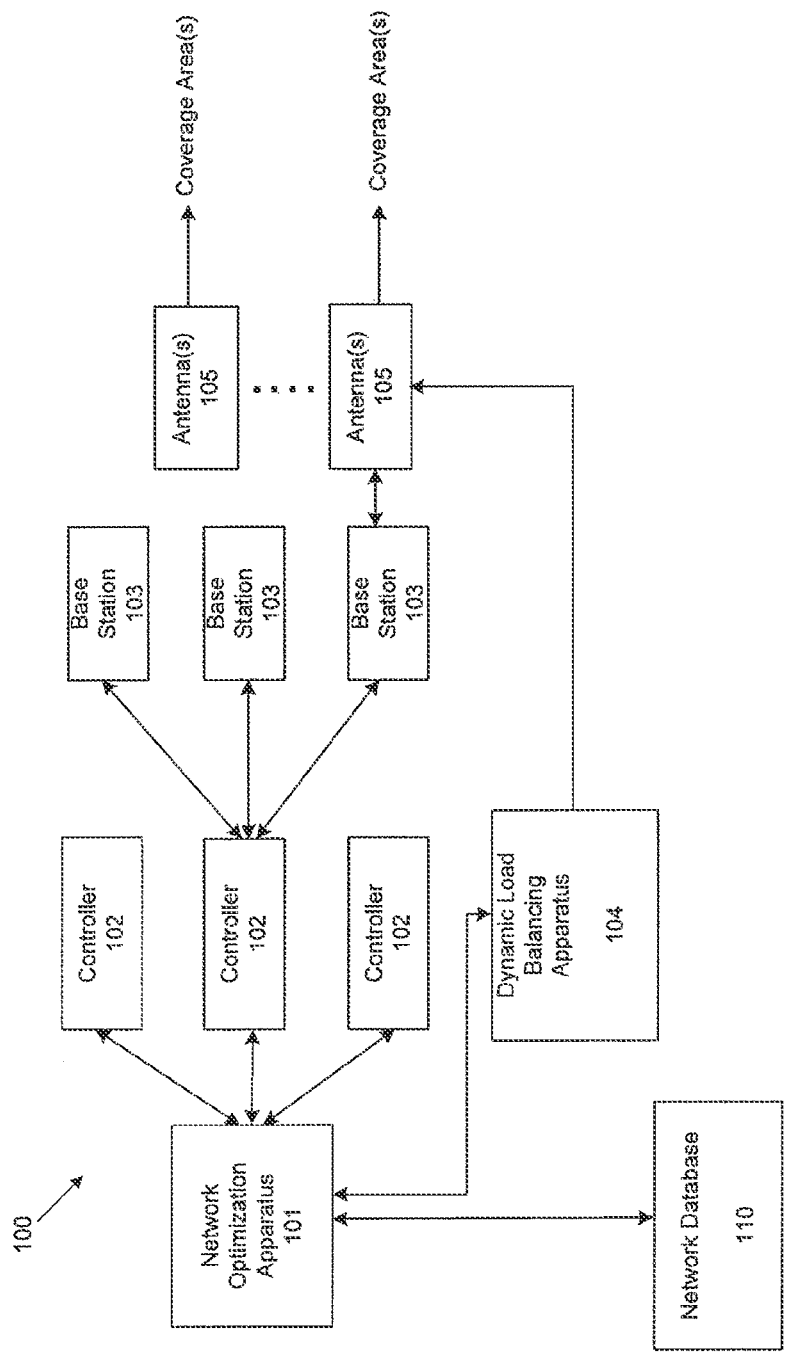
FIG. 1 illustrates a system for optimizing of network parameters in a wireless network in accordance with an embodiment of the invention.

Additional features are described herein, and will be apparent from the following description of the figures.

DETAILED DESCRIPTION OF THE INVENTION

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

In the drawings accompanying the description that follows, often both reference numerals and legends (labels, text descriptions) may be used to identify elements. If legends are provided, they are intended merely as an aid to the reader, and should not in any way be interpreted as limiting.

FIG. 1 is a system for optimizing of network parameters in a wireless network in accordance with an embodiment of the invention. In particular, the wireless network 100 illustrated in FIG. 1 includes a network optimization apparatus 101. The wireless network 100 refers to any type of computer network that is wireless, and is commonly associated with a telecommunications network whose interconnections are implemented without the use of wires such as with electromagnetic waves, such as radio waves or the like as a carrier. The basic components of the wireless network 100 include the network optimization apparatus 101, one or more controllers 102, and one or more base stations 103 (i.e., cell sites) for supporting data communications between subscribers distributed throughout coverage areas provided by the wireless network 100 via antennas 105 (i.e., sectors), a network database 110, and a dynamic load balancing apparatus 104.

It should be understood by one of ordinary skill in the art that the connections between the network optimization apparatus 101 and the one or more network controllers 102, the dynamic load balancing apparatus 104 and the network database 110 can be wireless, wired or a combination of wireless and wired. Similarly, it should be understood by one of ordinary skill in the art that the connections between the one or more controllers 102 and the one or more base stations 103 can be wireless, wired or a combination of wireless and wired.

As seen in FIG. 1, the network optimization apparatus 101 receives network statistics and the current network configurations from the network database 110 related to the wireless communication system 100 for assisting in the monitoring and optimization performed. The network statistics may include, but are not limited to, key performance Indicators (KPIs). An example of a KPI is the dropped calls rate, which is the ratio between the failed calls and the total number of calls requested. Another network statistic is the capacity of the network. Capacity can be measured by total number of calls and/or the amount of delivered data in bits or the throughput (overall data rate) in case of data calls.

A network parameter important to consider when performing network optimization is the number of handovers of end-user equipments between different sectors. User equipment has serving sectors, as the user moves between the coverage areas of different sectors, the serving sector will be changed as other sectors may have better signal quality. In a soft handover, the user will have more than one serving sector in the same time as the signal quality of different sectors are close to each other. The number of handovers between different sectors could be used as indicator of how close sectors are to each other, or an indicator to the dependency between different sectors.

Another network parameter important to consider when performing network optimization is a neighbor list. The neighbor list includes all the potential neighbors for a sector, and it may include neighbor priorities as well. A potential neighbor is a neighbor sector which may provided services to mobile equipment as part of a handover operation when the mobile equipment is traveling between different coverage areas. The neighbor lists of the sectors which are serving the mobile equipment may be arranged to construct one list to be sent to the mobile equipment. The mobile equipment will use this longer list to search for additional potential neighbors for handover operations.

The network optimization apparatus 101 can be a server or other similar computer device capable of executing an algorithm for performing optimization of network parameters in wireless network 100. A more detailed discussion of the structure of the network optimization apparatus 101 is noted below with reference to FIG. 5.

The controllers 102 illustrated in FIG. 1 are, for example, base station controllers (BSC), which are part of the wireless system infrastructure that control one or more of the base stations 103 and the corresponding coverage areas provided by the base stations 103. A plurality of subscribers (not shown) is distributed within the coverage areas for participating in wireless data communications provided by the wireless network 100 via the antennas 105. The subscribers have user equipment that may include various types of fixed, mobile, and portable two way radios, cellular telephones, personal digital assistants (PDAs), or other wireless networking devices.

Each coverage area behaves as an independent sector serving its own set of subscribers. For fixed wireless systems, such as IEEE802.16-2004, each coverage area can be used by a single base station 103 or plurality of base stations 103 operating each on a different frequency channel. For mobile systems, subscribers of a single coverage area are served by a single base station 103 that can be a single frequency channel for IEEE802.16e-2005 (or UMTS or 1x-EVDO Rev. B and C) or multiple frequency channels that can be supported by IEEE802.16m (or UMTS or 1xEVDO Rev. B and C).

As illustrated in FIG. 1, the dynamic load balancing apparatus 104 may also receive subscriber statistics. The dynamic load balancing apparatus 104 includes an algorithm that analyzes the data related to the wireless network 100 and sends control signals to the antennas and/or base stations 103 for altering or shaping the coverage areas. The load balancing algorithm may cluster users based on their instantaneous locations or by means of heuristic approaches; collects statistics to validate previous users clustering decisions and/or predicting new traffic patterns; and continuous learns and adaptively shapes the coverage areas and alters network parameters as the environment or traffic density changes with time. As seen in FIG. 1, network statistics received by the network optimization apparatus can also be provided to the dynamic load balancing apparatus 104.

Figure 2:
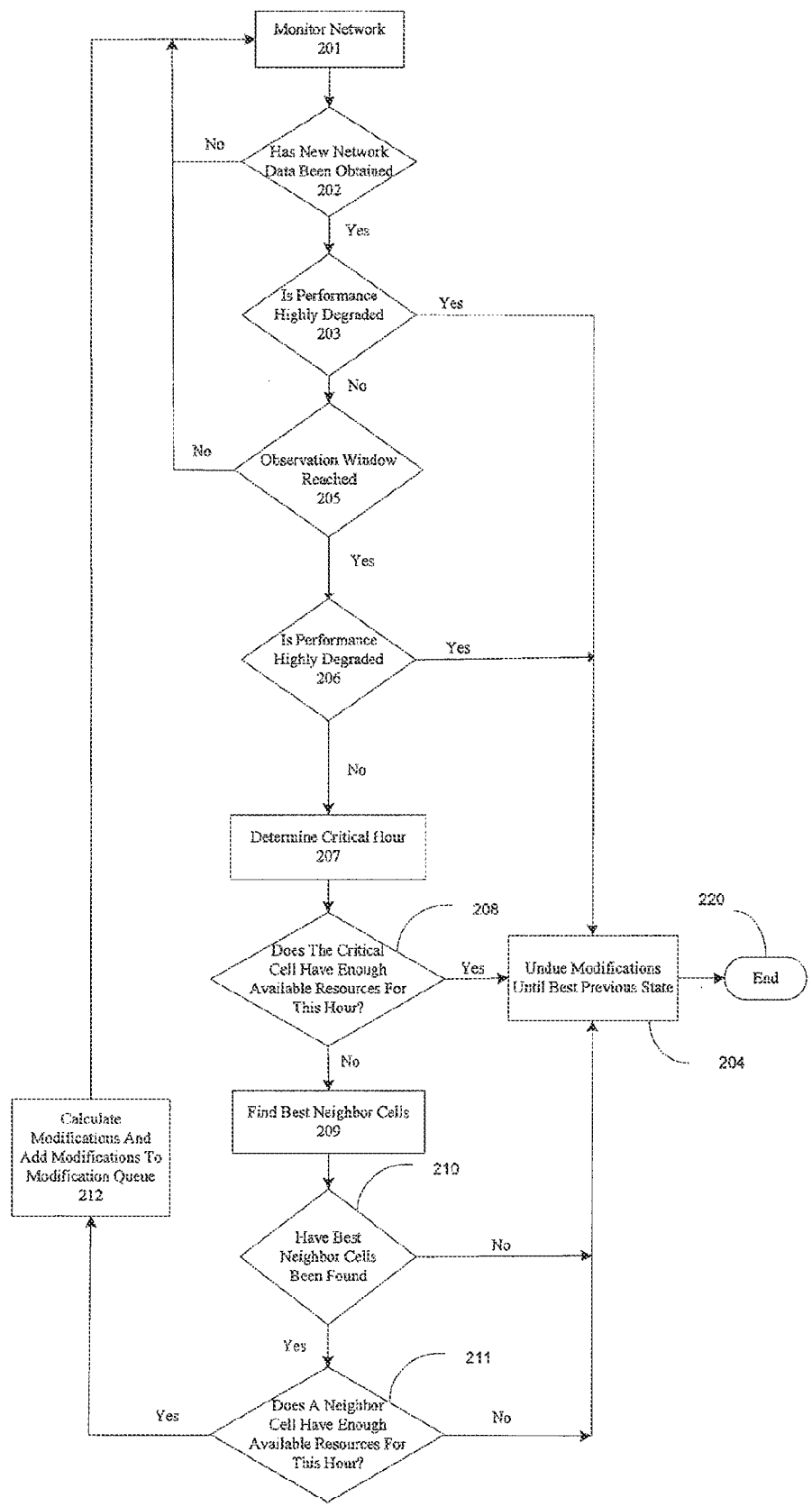
FIG. 2 illustrates a method for optimizing of network parameters in a wireless network in accordance with an embodiment of the invention.

FIG. 2 illustrates a method for optimizing of network parameters in a wireless network in accordance with an embodiment of the invention. By way of example, the self-optimization apparatus 101 can execute an algorithm stored therein for performing optimization operations.

Prior to optimizing operations on the wireless network, there needs to be an identification of zones (i.e., critical zones) in the wireless network requiring optimization. Identification of a critical zone will be discussed in more detail with reference to FIG. 3. The zones will be identified as a group of cell sites/sectors on which the optimization will be preformed. Identification of the zones needing optimization can be based on the critical cell site/sector that has performance problems based on some criteria. Additionally, different areas of the wireless network can be evaluated using different criteria. The criteria can be based on one or more performance metrics of the wireless network over a past period of time and/or one or more predicted performance metrics. These performance metrics can be based on previous performance and configurations as well as previous traffic and predicted traffic.

A performance metrics can be for a voice/data service for all services or for weighted services; and can be for the critical cell site/sector only or for the entire critical zone or for overall weighted performance between different cell sites/sectors. The performance metrics can also be for a specific time slot in a day or over a few days, for all times or for overall weighted times, and can be changed automatically or manually between different sets of performance metrics based on some criteria. For the criteria that changes automatically between different performance metrics sets, the criteria can be based on past or predicted configurations, performance metrics and/or traffic.

For each critical cell site/sector needing optimization, a local zone will be identified as the set of the neighbor cell sites/sectors based on some criteria, which can also be based on one or more performance metrics. For example, the performance metric can be based on the cells/sectors dropped call rate (DCR), which has exceeded certain dropped call rate threshold over certain window of time. The performance metric can also be calculated across specific time slots in different time frames. For example, Mondays to Fridays, Mondays only or Mondays to Fridays morning hours.

The local zone may contain only the critical cell/sector, direct neighbors of the critical site/sector or the direct neighbors and the neighbors of neighbors or additional levels of neighbors. For each group of overlapped local zones, critical zones will be identified as the union of these overlapped zones. The final critical zones may not include overlapping zones. The zone identification process is run continuously to identify new zones needing optimization.

The old and newly identified critical zones can also be ranked based on the criteria used in identifying the critical zones. Based on the available computing resource in the optimization system as well as the rank of the zones, one or more of the critical zones will be chosen for optimization in serial, parallel or both. When a critical zone is selected for optimization, the optimization will be conducted continuously as performance metric data and configurations arrive to the optimization apparatus, as shown in FIG. 2.

Referring now to FIG. 2, in step 201, the self-optimization apparatus 101 monitors the wireless network. The self-optimization apparatus 101 monitors performance after implementing recommended configuration modifications. In step 202, the network optimization apparatus 101 determines if new network data has been received. If not, then the wireless network will continue to be monitored, as in step 201. Otherwise, in step 203, the network optimization apparatus 101 will determine whether the operating conditions of the cell sites/sectors in the zones have been degraded based on the new data received. The criteria can be based on one or more of performance metrics similar to those noted above for indentifying the zones. For example, the performance metric can be based on the DCR of cells/sectors in the zones or capacity increases. If performance in the zone has degraded, then in step 204, the previous recommended configuration modifications are removed until the best previous operation state is achieved, and in step 220 the self-optimization process ends.

However, if the operating conditions of the zones have not been degraded based on the previous recommended configuration modifications, then in step 205 it is determined if an observation window has been reached. An observation window is simply a specified time period such a number or days. For example, the optimization apparatus may determine that it is necessary to monitor network data for a certain numbers of days. If an observation window has not been reached, then the wireless network will continue to be monitored, as in step 201. However, once the observation window has been reached, performance metrics can be calculated and compared to performance metrics before the previous recommended configuration modifications or compared to the first KPIs. An algorithm will evaluate the KPIs after the previous observation windows have been reached and find the configurations which resulted in the best KPIs. If the current network performance is better, then the previous recommended configuration modifications will be accepted. However, if performance is degraded, then the previous recommended configuration modifications are removed.

Thus, after the observation window has been reached in step 205 then, in step 206 it is determined if the operating conditions of the cell sites/sectors in the zones have been degraded. If a degraded condition is determined in step 206, then in step 204 the previous recommended configuration modifications are removed until the best previous operation state is achieved, and in step 220 the self-optimization process ends. If in step 206 it is determined that the operating conditions of the cell sites/sectors in the zones have not been degraded, then in step 207 a critical hour is determined.

The critical hour may be the specific time a zone suffers from a highly degraded condition. In step 208, it is determined if the critical cell/sector has enough available resources for the critical hour. For example, the determination of available resources could be based on, but is not limited to, the number of calls which could be additionally served by the critical cell site/sector; how many calls could be averagely served by any used hardware; or how many calls could be averagely served by the unused power. If the number of calls is determined to be less or greater than a preset/dynamic threshold, then it can be determined if the critical cell site/sector has adequate available resources to address the degraded condition.

If it is determined that the cell site/sector has available resources, then the previous recommended configuration modifications are removed (in step 204) and, for example, load balancing techniques can be used to address the degradation condition in the zone instead. The optimization process is then ended in step 220. If the cell site/sector does not have adequate available resources, then in step 209 a best neighbor cell site/sector is determined for assisting in addressing the degraded condition. For example, from the critical cell sectors/site neighbor list, the top neighbors are determined based on which neighbors sectors/sites have a high number of handovers with the critical cell site/sector; and/or the neighbor cell sectors/cells with antenna beams looking toward the critical site/sector; and/or the neighbor cell sectors/sites which has high available resources.

In step 210, if no best neighbor site is found, then the previous recommended configuration modifications are removed in step 204 and the optimization process is ended in step 220. In the alternative, if no best neighbor is found using the current criteria, then the search criteria for a best neighbor cell/sector could be modified or made more flexible, for example, to determine neighbor cells/sectors with a lower number of handovers. Found best neighbor cells/sectors could be in the same cell site/sector location or different location from the critical cell site/sector. Additionally, there can be different priorities if the neighbor cell sectors/sites are in different cell site/sector location than for neighbor cell sectors/sites in same cell site/sector location. These priorities can be specified using a weighted metrics and the status of whether the neighbor cell sectors/sites is in the same or different cell site/sector.

If a best neighbor site/or cell is found in step 210, then in step 211 it is determined if the best neighbor cell has adequate available resources for addressing the degraded condition. If the best neighbor cell/sector does not have adequate available resources, then the previous recommended configuration modifications are removed in step 204 and the optimization process is ended in step 220. If the best neighbor cell has adequate available resources for addressing the degraded condition, then configuration modifications are calculated and added to the modification queue in step 212 for application to the wireless network.

The calculated configuration modification could be that, for example, the critical cell site/sector antenna down tilt will be increased and/or the critical cell site/sector transmitted power will be decreased; the critical cell site/sector antenna pointing direction will be moved away from the neighbor which has more available resources or away from a neighbor cell/sector which has less available resources; and/or the critical cell site/sector antenna beamwidth will be decreased; and/or the critical cell site/sector transmitted power will be decreased to compensate for the increase in gain cased by decreasing beamwidth.

Additionally the calculated configuration modification could be that, for example, that the best neighbor cell site/sector antenna down tilt will be decreased and/or the best neighbor cell site/sector transmitted power will be increased; the best neighbor cell site/sector antenna pointing direction will be moved towards the critical cell site/sector; and/or the best neighbor cell site/sector antenna beamwidth will be increased; and/or the best neighbor cell site/sector transmitted power will be increased to compensate for the decrease in gain cased by increasing beamwidth. The recommendations above can be implemented simultaneously or sequentially or with time delay in between or delayed until the next window is reached or until all delayed recommendations are implemented.

Once the recommendation modifications are determined, the wireless network is monitored (as in step 201) to determine if the recommendation modification address the degraded condition.

Exemplary Application

The following is an example of the method of optimizing a wireless network that is consistent the method described above with reference to FIG. 2.

1. The critical Hour is identified as Hour 9 (as expected from the traffic model)
2. For cell 4_2, Hour 9, the available resources is below the threshold; hence load balancing could help resolving it.
3. Best Neighbor search result is Cell 194_1
4. The Zone accumulated DCR is recorded (32.94) before implementing any changes
5. Change Cell 4_2 configuration as follows:
    a. Increase the down tilt of the critical cell 4_2 by 1 Deg
    b. Decrease the Power By 1.5 dB
6. Monitor the performance for n days (In this case 5 days)
7. After n days, the 5 days accumulated DCR is enhanced as the Zone accumulated DCR is changed from 32.94 to 32.601 and the capacity have not degraded
8. Decrease the down tilt of the best neighbor 194_1 by 1 deg
9. Monitor the performance for n days (In this case 5 days)
10. After n days, the 5 days accumulated DCR is found to be degraded to be 32.675 However it is still below the original accumulated DCR of 32.94
11. Best Neighbor search result is Cell 10_3
12. Change Cell 4_2 configuration as follows:
    a. Increase the down tilt of the critical cell 4_2 by 1 Deg
    b. Decrease the Power By 1.5 dB
13. Monitor the performance for n days (In this case 5 days)
14. After n days, the 5 days accumulated DCR is enhanced as the Zone accumulated DCR is changed to 31.962 and the capacity have not degraded
15. Decrease the down tilt of the best neighbor 10_3 by 1 deg
16. Monitor the performance for n days (In this case 5 days)
17. After n days, the 5 days accumulated DCR is enhanced to be 31.866
18. Repeat 11 to 14 and the 5 days accumulated DCR becomes 31.168
19. Repeat 15 to 17 and the 5 days accumulated DCR becomes 30.997
20. Now Cell 4_2 has free available resources and load balancing will not help in increasing the capacity of the network.

Figure 3:
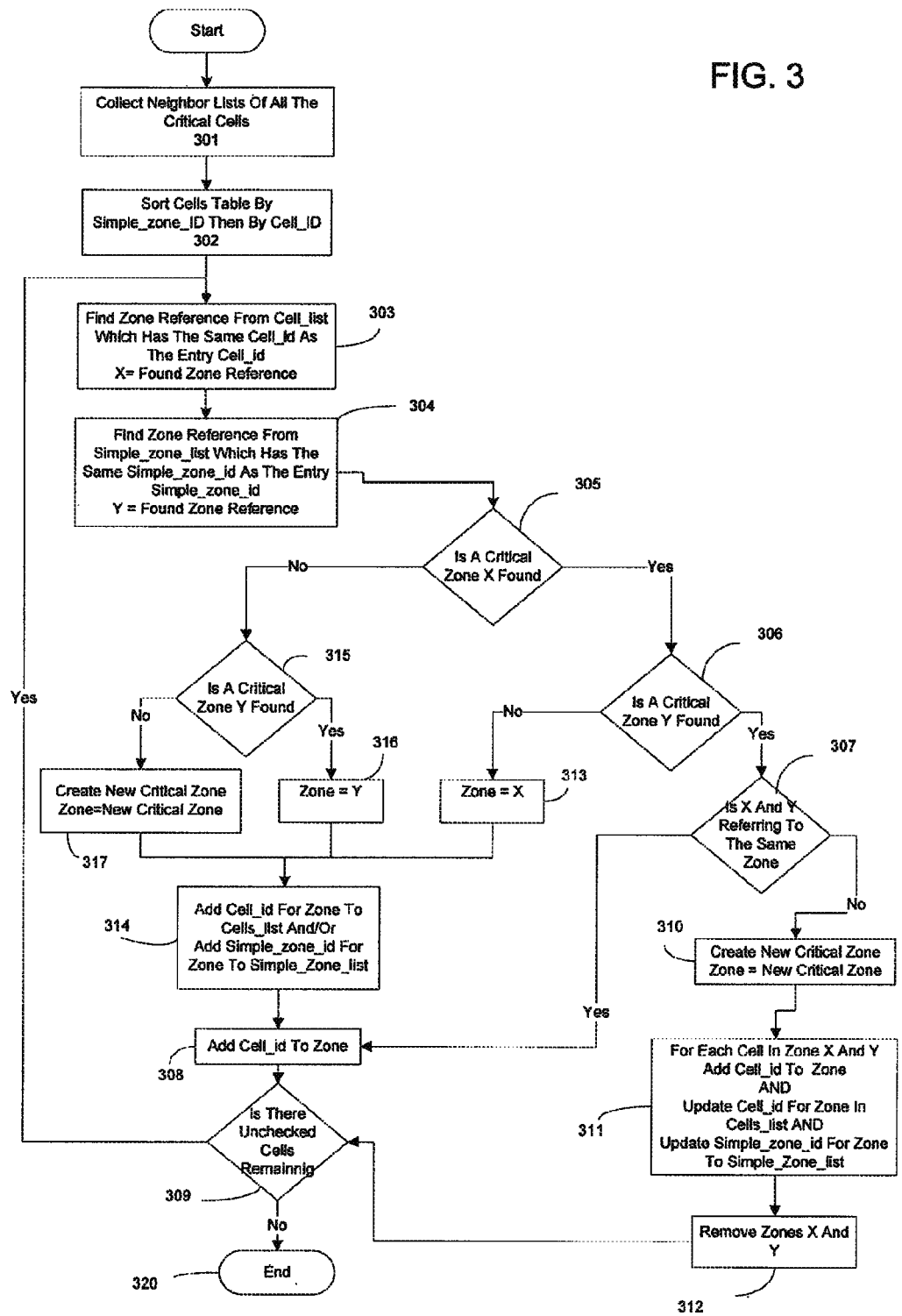
FIG. 3 illustrates a method for determining a critical zone requiring optimizing of network parameters in accordance with an embodiment of the invention.

FIG. 3 illustrates a method for determining a critical zone requiring optimizing of network parameters in accordance with an embodiment of the invention. In step 301, neighbor lists are collected for a critical cell/sector. The neighbor list includes all the potential neighbor cell/sectors for a particular a cell/sector, and it may include neighbor priorities as well. A potential neighbor cell/sector is a cell/sector that provides services to mobile equipment as part of a handover operation when the mobile equipment is traveling from one coverage area to another. The neighbor list can be stored in the network database 110.

The neighbor list can be stored in the network database 110 in the form of table that includes a list of cells and a corresponding list of zones. For each critical cell site/sector needing optimization, a local zone will be identified as the set of the neighbor cell sites/sectors based on some criteria, which can also be based on one or more performance metrics. A "cells table" will be formed to contain all the cells in the local zones of all the critical cells/sectors, and it will contain cell_id and simple_zone_id=local_zone_id for each cell. A "simple zone list" saves the checked/partially checked local zones during the search, and it contains the simple zone id and the corresponding final zone. The "cells list" saves the checked/partially checked cells during the search, and it contains the cell_id and the corresponding final zone.

In step 302, the cells table is sorted by simple zone_ID and then by cell_ID. Initially both the cells list and simple zone list are empty. For each entry in the cells table the following operation take place. In step 303, an X zone reference is determined from the cell list based on finding a cell_ID that matches the cell_ID entered for a cell. In step 304, a Y zone reference is determined from the simple zone list based on finding a zone_ID that matches the zone_ID entered for the cell. Once the X zone reference and Y zone reference are determined for the critical cell, it then needs to be determined if the X zone reference and the Y zone reference are included in a critical zone. In step 305, it is determined if the X zone reference is in a critical zone. If the X zone reference is in a critical zone, then in step 306 it is determined if the Y zone reference is in a critical zone. If both the X zone reference and the Y zone reference are included in a critical zone, then in step 307 it is determined if the X zone reference and the Y zone reference refer to the same zone. If the X zone reference and the Y zone reference also refer to the same zone, then in step 308, the cell_ID is added to this final critical zone. In step 309, it is determined if any cells in the cells table has been unchecked. If not, the process is ended in step 320. If there are cells in the cells table that have not been checked, then the remaining cells in the cells table are checked by returning to step 303.

In step 307, if the X zone reference and the Y zone reference are referring to the different zones, then a new critical zone is created in step 310. In step 311, the X zone reference and the Y zone are included in the new final critical zone, the cell list in the database 110 is updated for the newly created zone (i.e., by cell_ID and zone_ID) and the zone in the simple zone list is updated for the newly created zone. Also, in step 312 the previous zones for the X zone reference and the Y zone reference are removed. The process then returns to step 309 where it is determined if any cells in the cells table has been unchecked. If not, the process is ended in step 320. However, if there are cells in the cells table that have not been checked, then the remaining cells in the cells table are checked by returning to step 303.

In step 306, if it is determined that the X zone reference is in a critical zone, but the Y zone reference is not, then in step 313 it is determined that the X zone reference is the final critical zone, as in steps 314 and 308, the Y zone reference is added to the final critical zone that includes X. The process then returns to step 309 where it is determined if any cells in the cells table has been unchecked. If not, the process is ended in step 320. However, if there are cells in the cells table that have not been checked, then the remaining cells in the cells table are checked by returning to step 303.

In step 305, if it is determined that the X zone reference is not in a critical zone then in step 315 it is determined if the Y zone reference is in a critical zone. If it is determined that X zone reference is not in a critical zone, but the Y zone reference is in a critical zone, then in step 316, it is determined that the Y zone reference is the final critical zone, as in steps 314 and 308, the X zone reference is added to the final critical zone that includes the Y zone reference. The process then returns to step 309 where it is determined if any cells in the cells table has been unchecked. If not, the process is ended in step 320. However, if there are cells in the cells table that have not been checked, then the remaining cells in the cells table are checked by returning to step 303.

In step 315, if it is determined that the X zone reference is not in a critical zone, and the Y zone reference is not in a critical zone, then in step 317, a new critical zone is created that includes the X zone reference and the Y zone reference. Then in steps in steps 314 and 308, the IDs for the newly added zone are added to cell list and simple zone list and the X zone reference and the Y zone reference are added to a final critical zone. The process then returns to step 309 where it is determined if any cells in the cells table has been unchecked. If not, the process is ended in step 320. However, if there are cells in the cells table that have not been checked, then the remaining cells in the cells table are checked by returning to step 303.

Figure 4:
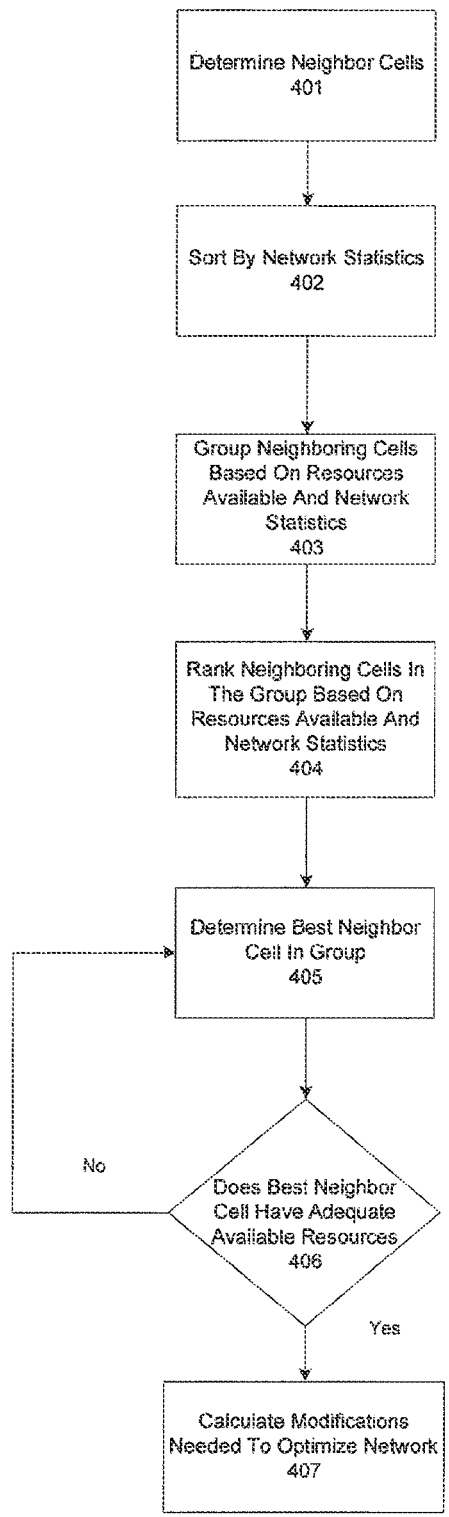
FIG. 4 illustrates a method for determining a best neighbor cell in accordance with an embodiment of the invention.

FIG. 4 illustrates a method for determining a best neighbor cell in accordance with an embodiment of the invention. As noted above, if a critical cell site/sector does not have adequate available resources, then it is important (for performing network optimization) to determine neighbor cell sites/sectors that can assisting in addressing any degraded conditions In step 401, the neighbor cells/sectors are determined based on the cells list table in the database 110. In step 402, the neighbor list is sorted by network statistics. As noted above, network statistics may include, but are not limited to, key performance Indicators (KPIs). An example of a KPI is the dropped calls rate or handovers, which is the ratio between the failed calls and the total number of calls requested. The network statistics may also include, but are not limited to the following:

Exemplary Switch Statistics
UL and DL Stats For Each Sector/Carrier: Load, Erlangs and Throughput
Capacity For Each Sector/Carrier
Sensitive KPIs To Operators Per Sector/Carrier Such as Dropped Calls and Blocked Calls
Location Of Most Users (Clusters)
Year/Month/Day/Time
Cell ID
Antenna ID
Carrier Frequency
Number Of Established Calls
Channel Elements (CE) Primary Use
% Primary Traffic CE Usage
% Secondary Traffic CE Usage
Total CE Usage (Erlang)
Peak # of Walsh Codes
Soft Handover Overhead %
Soft or hard handover counts
Peak DL Power Number Of Dropped And Lost Calls
Number Of Blocked Calls
UL Thermal Noise Floor (main)
UL thermal Noise Floor (diversity)
Average DL Power
Pilot, Paging and Sync Channels Powers
Peak Number of Primary Walsh codes
Reported Or Calculated Sector Load For UL
Exemplary Network Parameters
Site Latitude And Longitude
Type: Macro-Cell, Micro-Cell, Repeater
Handoff Parameters (T_Add, T_Drop, Tt_Drop, T_Comp)
PA Output Power
Antenna Direction
Antenna Height Above Ground And Sea Level
Antenna Model, Azimuth BW, Elevation BW, Gain, Electrical And Mechanical Tilt
PN Offset Per Sector
Morphology: Urban, Highway, Suburban, Rural, Dense Urban
Number Of RF Carriers Per Sector And Their Frequencies
Equipment Multi-Antenna Capability: Rx Diversity, STC, MIMO
Losses From PA Output To Antenna Ports If Applicable
Multi-Carriers To Antennas Mapping
Technology: WIMAX, UMTS, HSxPA, CDMA2000, 1xRTT, 1x-EVDO Rev. A, B or C, GSM, etc., And Supported Features By The Equipment In step 403, the neighbor cells are then grouped based on available resources and network statistics. The grouped neighbor cells are sorted based on network statistics. Then, in step 404, the neighbor cells in the first group are ranked based on their available resources. For example, the top neighbor cell sites/sectors may have a high number of handovers with the critical cell site/sector, or the top neighbor cell sites/sectors may have antenna beams looking toward the critical site/sector. In step 405 the best neighbor cells/sectors in the group is determined. In step 406, it is determined if the best neighbor cell has adequate available resources to address the degraded condition. If not, then another best neighbor cell from the group is determined, as in step 405, which has resources available to address the degraded condition. Once a best neighbor cell/sector is determined, then in step 407, recommended modifications to the wireless network are calculated. If the best neighbor is not found, the next group will be searched using the same criteria.

As noted above, the calculated configuration modification could be that, for example, the critical cell site/sector antenna down tilt will be increased and/or the critical cell site/sector transmitted power will be decreased; the critical cell site/sector antenna pointing direction will be moved away from the neighbor which has more available resources or away from a neighbor cell/sector which has less available resources; and/or the critical cell site/sector antenna beamwidth will be decreased; and/or the critical cell site/sector transmitted power will be decreased to compensate for the increase in gain cased by decreasing beamwidth.

Additionally, the calculated configuration modification could be that, for example, that the best neighbor cell site/sector antenna down tilt will be decreased and/or the best neighbor cell site/sector transmitted power will be increased; the best neighbor cell site/sector antenna pointing direction will be moved towards the critical cell site/sector and/or the best neighbor cell site/sector antenna beamwidth will be increased; and/or the best neighbor cell site/sector transmitted power will be increased to compensate for the decrease in gain cased by increasing beamwidth. The recommendations above can be implemented simultaneously or sequentially or with time delay in between.

Figure 5:
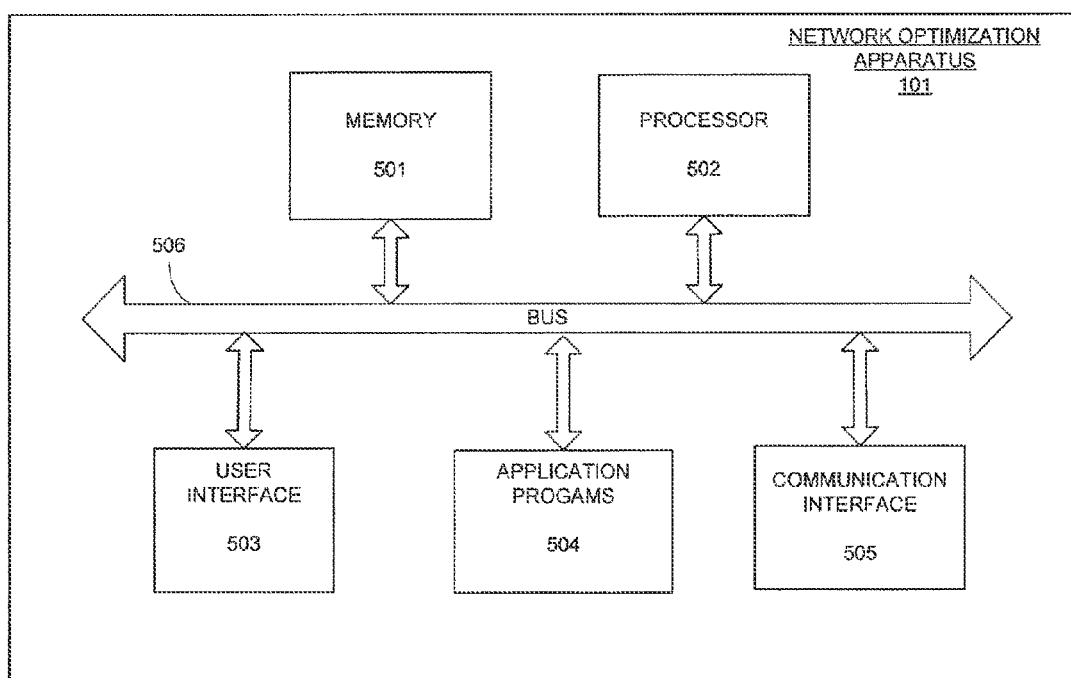
FIG. 5 illustrates an apparatus for optimizing of network parameters in a wireless network in accordance with an embodiment of the invention.

FIG. 5 is a more detailed description of optimization apparatus 101 for performing the method of self-optimization as previously described with reference to FIGS. 2-4. In FIG. 5, the optimization apparatus 101 includes a memory 501, a processor 502, user interface 503, application programs 504, communication interface 505, and bus 506.

The memory 501 can be computer-readable storage medium used to store executable instructions, or computer program thereon. The memory 501 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program is also intended to include an algorithm that includes executable instructions stored in the memory 501 that are executable by one or more processors 502, which may be facilitated by one or more of the application programs 504. The application programs 504 may also include, but are not limited to, an operating system or any special computer program that manages the relationship between application software and any suitable variety of hardware that helps to make-up a computer system or computing environment of the self-optimization apparatus 501. General communication between the components in the self-optimization apparatus 101 is provided via the bus 506. The self-optimization algorithm as described with reference to FIGS. 2-4 can be stored, for example, in the memory 501 of the self-optimization apparatus 101.

The user interface 503 allows for interaction between a user and the self-optimization apparatus 101. The user interface 503 may include a keypad, a keyboard, microphone, and/or speakers. The communication interface 505 provides for two-way data communications from the self-optimization apparatus 101. By way of example, the communication interface 505 may be a digital subscriber line (DSL) card or modem, an integrated services digital network (ISDN) card, a cable modem, or a telephone modem to provide a data communication connection to a corresponding type of telephone line. As another example, communication interface 505 may be a local area network (LAN) card (e.g., for Ethernet™ or an Asynchronous Transfer Model (ATM) network) to provide a data communication connection to a compatible LAN.

Further, the communication interface 505 may also include peripheral interface devices, such as a Universal Serial Bus (USB) interface, a Personal Computer Memory Card International Association (PCMCIA) interface, and the like. The communication interface 505 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown).

From the description provided herein, those skilled in the art are readily able to combine software created as described with the appropriate general purpose or special purpose computer hardware for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

What is claimed is:

1. A method, comprising:
sending a first configuration signal to a first antenna from a plurality of antennas of a wireless network to change at least one configuration of the first antenna;
storing a value of a performance metric of the wireless network in response to the sending the first configuration signal;
defining a critical zone of the wireless network based on the value of the performance metric and an operational condition associated with the performance metric, the critical zone including the first antenna and a set of neighbor antennas associated with the first antenna, the set of neighbor antennas being from the plurality of antennas; and
sending a second configuration signal to one of the first antenna or a second antenna to change at least one configuration of the first antenna or the second antenna based on whether the first antenna has available resources for achieving a predefined improvement in the performance metric, the second antenna being selected from the set of neighbor antennas.

2. The method of claim 1, further comprising:
repeatedly altering wireless network parameters of the set of neighbor antennas until the predefined improvement in the performance matric is achieved.

3. The method of claim 1, wherein:
the at least one configuration of the first antenna includes at least one of an antenna tilt, an antenna power, an antenna direction, or an antenna beamwidth.

4. The method of claim 1, wherein:
the first configuration signal relates to a first parameter type, and
the second configuration signal relates to a second parameter type different from the first parameter type.

5. The method of claim 1, wherein:
the first configuration signal is sent to change at least one configuration of a group of antennas including the first antenna, the group of antennas including at least two antennas from the plurality of antennas.

6. The method of claim 1, wherein:
the second configuration signal is sent to change at least one configuration of a group of antennas including the first antenna or the second antenna, the group of antennas including at least two antennas from the plurality of antennas.

7. The method of claim 1, wherein:
the critical zone includes a cell site or sector from a plurality of cell sites or sectors that meets the operational condition.

8. The method of claim 1, wherein:
the critical zone is defined after monitoring the value of the performance metric of the wireless network over a period of time.

9. A non-transitory processor-readable medium storing code representing instructions to be executed by a processor, the code comprising code to cause the processor to:
alter a first configuration parameter of a first antenna from a plurality of antennas of a wireless network to change at least one configuration of the first antenna;
measure a value of a performance metric of the wireless network associated with the first configuration parameter;
define a critical zone of the wireless network based on the value of the performance metric and an operational condition associated with the performance metric, the critical zone including the first antenna and a set of associated antennas associated with the first antenna, the set of associated antennas being from the plurality of antennas; and
alter a second configuration parameter of one of the first antenna or a second antenna to change at least one configuration of the first antenna or the second antenna based on whether the first antenna has available resources for achieving a predefined improvement in the performance metric, the second antenna being selected from the set of associated antennas.

10. The non-transitory processor-readable medium of claim 9, the code further comprising code to cause the processor to:
repeatedly alter wireless network parameters of the set of associated antennas until the predefined improvement in the performance metric is achieved.

11. The non-transitory processor-readable medium of claim 9, wherein:
the first configuration parameter of the first antenna includes at least one of an antenna tilt, an antenna power, an antenna direction, or an antenna beamwidth.

12. The non-transitory processor-readable medium of claim 9, wherein:
the first configuration parameter relates to a first parameter type, and
the second configuration parameter relates to a second parameter type different from the first parameter type.

13. The non-transitory processor-readable medium of claim 9, wherein:
the first configuration parameter alters at least one configuration of a group of antennas including the first antenna, the group of antennas including at least two antennas from the plurality of antennas.

14. The non-transitory processor-readable medium of claim 9, wherein:
the second configuration parameter alters at least one configuration of a group of antennas including the first antenna or the second antenna, the group of antennas including at least two antennas from the plurality of antennas.

15. The non-transitory processor-readable medium of claim 9, wherein:
the critical zone includes a cell site or sector from a plurality of cell sites or sectors that meets the operational condition.

16. The non-transitory processor-readable medium of claim 9, wherein:
the critical zone is defined after monitoring a value of the performance metric of the wireless network over a period of time.

17. A method, comprising:
measuring a performance metric value of a wireless network and associated with a first configuration parameter value, the first configuration parameter value is associated with a first antenna from a plurality of antennas of the wireless network to change a configuration of the first antenna based on the first configuration parameter value;

if the performance metric value associated with the first configuration parameter value does not meet an operational condition, sending, via a processor, the first configuration parameter value to the first antenna to change the configuration of the first antenna based on the first configuration parameter value;

if the performance metric value associated with the first configuration parameter value meets the operational condition, and if the first antenna has available resources for achieving a predefined performance improvement for the wireless network, sending, via the processor, a second configuration parameter value to the first antenna to change the configuration of the first antenna based on the second configuration parameter value; and if the performance metric value of the wireless network associated with the first configuration parameter value meets the operational condition, and if the first antenna does not have available resources for achieving the predefined performance improvement for the wireless network,
(1) selecting, via the processor, a second antenna from the plurality of the antennas, and
(2) sending, via the processor, a third configuration parameter value to the second antenna to change a configuration of the second antenna based on the third configuration parameter value.

18. The method of claim 17, further comprising:
defining a critical zone of the wireless network based on the performance metric value and the operational condition associated with the performance metric value, the critical zone includes a cell site or sector from a plurality of cell sites or sectors that meets the operational condition.

19. The method of claim 17, further comprising:
defining a critical zone of the wireless network based on the performance metric value and the operational condition associated with the performance metric value, the critical zone includes a cell site or sector from a plurality of cell sites or sectors that meets the operational condition,
the critical zone including the first antenna and a set of neighbor antennas from the plurality of antennas.

20. The method of claim 17, further comprising:
defining a critical zone of the wireless network based on the performance metric value and the operational condition associated with the performance metric value, the critical zone includes a cell site or sector from a plurality of cell sites or sectors that meets the operational condition,
the critical zone including the first antenna and a set of neighbor antennas from the plurality of antennas,
the second antenna being selected from the set of the neighbor antennas.

* * * * *

UNITED STATES PATENT AND TRADEMARK OFFICE
CERTIFICATE OF CORRECTION

PATENT NO.        : 9,226,178 B2
APPLICATION NO.   : 14/195515
DATED             : December 29, 2015
INVENTOR(S)       : Osama Tarraf et al.

Page 1 of 1

It is certified that error appears in the above-identified patent and that said Letters Patent is hereby corrected as shown below:

Claims

Column 14, line 9, Claim 9 change "pluralityof" to -- plurality of --.

Signed and Sealed this
Tenth Day of May, 2016

Michelle K. Lee
*Director of the United States Patent and Trademark Office*